United States Patent
Chen et al.

(10) Patent No.: US 10,951,149 B2
(45) Date of Patent: Mar. 16, 2021

(54) METHOD AND APPARATUS FOR PULSE-WIDTH MODULATION OF A VARIABLE-FREQUENCY DRIVE

(71) Applicant: EATON CORPORATION, Cleveland, OH (US)

(72) Inventors: Yilun Chen, Shanghai (CN); Xiaomeng Cheng, Shanghai (CN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 133 days.

(21) Appl. No.: 14/900,033

(22) PCT Filed: Jun. 27, 2014

(86) PCT No.: PCT/CN2014/080977
§ 371 (c)(1),
(2) Date: Dec. 18, 2015

(87) PCT Pub. No.: WO2014/206341
PCT Pub. Date: Dec. 31, 2014

(65) Prior Publication Data
US 2017/0272017 A1    Sep. 21, 2017

(30) Foreign Application Priority Data

Jun. 28, 2013  (CN) .......................... 201310265563.9

(51) Int. Cl.
*H02P 21/22* (2016.01)
*H02M 7/5387* (2007.01)
(Continued)

(52) U.S. Cl.
CPC .............. *H02P 21/22* (2016.02); *F04B 49/06* (2013.01); *F04B 49/065* (2013.01);
(Continued)

(58) Field of Classification Search
CPC .......... H02P 21/22; H02P 27/08; F04B 49/06; H02M 7/53875
See application file for complete search history.

(56) References Cited

U.S. PATENT DOCUMENTS

| | | | | |
|---|---|---|---|---|
| 4,847,743 A | * | 7/1989 | Kamiyama | ....... H02M 7/53875 363/132 |
| 2009/0200975 A1 | * | 8/2009 | Hayashi | ................ B62D 5/046 318/432 |

(Continued)

FOREIGN PATENT DOCUMENTS

| | | | |
|---|---|---|---|
| CN | 1574605 A | | 2/2005 |
| JP | 2002305890 A | * | 10/2002 |
| WO | WO 96/18234 A1 | | 6/1996 |

OTHER PUBLICATIONS

NPL1: www.ti.com. (1998). Field Orientated Control of 3-Phase AC-Motors. [online] Available at: http://www.ti.com/lit/an/bpra073/bpra073.pdf [Accessed (Year: 1998).*

(Continued)

*Primary Examiner* — Eduardo Colon Santana
*Assistant Examiner* — Said Bouziane
(74) *Attorney, Agent, or Firm* — Merchant & Gould P.C.

(57) ABSTRACT

The present invention disclose a method and apparatus for pulse-width modulation (PWM) of a variable-frequency drive (VFD), the method comprising: for each sector of a space vector graph for PWM of the VFD, identifying at least two possible clamping phases in switching between the vectors in the sector; comparing currents in multiple phases in at least one PWM cycle; in the sector of the space vector graph corresponding to the PWM cycle, determining the possible clamping phase with the maximum current in the at least two possible clamping phases; and clamping the determined possible clamping phase with the maximum current.

10 Claims, 4 Drawing Sheets

(51) Int. Cl.
　　　H02P 23/00　　　(2016.01)
　　　F04B 49/06　　　(2006.01)
　　　H02P 27/08　　　(2006.01)
(52) U.S. Cl.
　　　CPC .... *H02M 7/53875* (2013.01); *H02P 23/0077* (2013.01); *H02P 27/08* (2013.01); *H02M 2007/53876* (2013.01)

(56) References Cited

U.S. PATENT DOCUMENTS

2012/0249043 A1* 10/2012 Soares .............. H02M 7/53875
　　　　　　　　　　　　　　　　　　　　　　　　　318/722
2012/0300514 A1* 11/2012 Kolar .................. H02J 3/1857
　　　　　　　　　　　　　　　　　　　　　　　　　363/41

OTHER PUBLICATIONS

International Search Report for corresponding International Patent Application No. PCT/CN2014/080977 dated Sep. 30, 2014.
Extended European Search Report for corresponding European Patent Application No. 14818698.4 dated Feb. 9, 2017, 8 pgs.
Cheng, X. et al., "A two-phase SVPWM strategy for dead-time compensation", International Conference on Electrical Machines and Systems (ICEMS), 1005-1010 (2008).
Kaku, B. et al., "Switching loss minimised space vector PWM method for IGBT three-level inverter", IEE Proceedings: Electric Power Applications, Institution of Electrical Engineers, 144(3): 182-190 (1997).

* cited by examiner

METHOD AND APPARATUS FOR PULSE-WIDTH MODULATION OF A VARIABLE-FREQUENCY DRIVE

This application is a National Stage Application of PCT/CN2014/080977, filed 27 Jun. 2014, which claims benefit of Serial No. 201310265563.9, filed 28 Jun. 2013 in China and which applications are incorporated herein by reference. To the extent appropriate, a claim of priority is made to each of the above disclosed applications.

FIELD OF THE INVENTION

This invention relates to a variable frequency drive (VFD), such as a VFD used in an electro-hydraulic pump system, particularly to a method and apparatus for pulse width modulation (PWM) of a VFD.

BACKGROUND OF THE INVENTION

Currently, there is an increasing demand for energy efficiency of a hydraulic system comprising a VFD, an electric motor and a hydraulic pump. Dual (or multi-) displacement pumps have been proposed to reduce the electric motor size in a pressure keeping condition, since a smaller displacement will result in a lower torque requirement for the electric motor. Thus, a motor with lower rated power can be selected to reduce the system cost.

Problems may exist at the instant of displacement switching between the flow control mode and pressure control mode. If the displacement switches too early, the output flow will decrease, which cannot be compensated without an additional flow sensor. Therefore, the industry tends to conservatively switch displacement late to guarantee a constant flow output. However, this will further increases the motor torque requirement, which may even break down the VFD inverter due to over-current.

Problems may also exist in high flow and high pressure conditions. In such cases, the VFD works at its peak power capability. If by chance a mechanical jam occurs, a larger torque will be needed to overcome this control disturbance, which may also break down the VFD inverter due to over-current.

Therefore, a solution to increase the maximum rated current of the VFD with a small cost increase is important for the reliability of a low cost system such as one with dual (or multi-) displacement pumps.

In addition, Inverters using the PWM technique have been widely used in electro-hydraulic pump systems. However, the traditional PWM method may bring about switching losses, which is harmful to VFD reliability. With the increase of the switching frequency of the VFD and the rated system power, the problem of switching losses aggravates, which leads to a lower efficiency and hazards the safe operation of the switching devices. Therefore, this problem also needs to be overcome to achieve higher efficiency and reliability.

SUMMARY OF THE INVENTION

In order to increase the maximum rated current of the VFD and reduce the switching losses in an electro-hydraulic system, for example, a technical solution of the present invention is proposed.

In one aspect of the present invention, there is provided a method for PWM of a VFD, comprising: for each sector of a space vector graph for PWM of the VFD, identifying at least two possible clamping phases in switching between the vectors in the sector; comparing currents in multiple phases in a PWM cycle; in the sector of the space vector graph corresponding to the PWM cycle, determining the possible clamping phase with the maximum current in the at least two possible clamping phases; and clamping the determined possible clamping phase with the maximum current.

In another aspect of the present invention, there is provided an apparatus for PWM of a VFD, comprising: an identifying module configured to, for each sector of a space vector graph for PWM of the VFD, identify at least two possible clamping phases in switching between the vectors in the sector; a comparison module configured to compare currents in multiple phases in a PWM cycle; a determination module configured to, in the sector of the space vector graph corresponding to the PWM cycle, determine the possible clamping phase with the maximum current in the at least two possible clamping phases; and a clamping module configured to clamp the determined possible clamping phase with the maximum current.

Solutions according to embodiments of the present invention have at least one of the following advantages: reducing the switching losses during PWM of the VFD; increasing the maximum rated current of the VFD; and needing only a small amount of calculations, and being a low-cost solution.

BRIEF DESCRIPTION OF THE ACCOMPANYING DRAWINGS

DETAILED DESCRIPTION OF EXEMPLARY EMBODIMENTS

Figure 1:
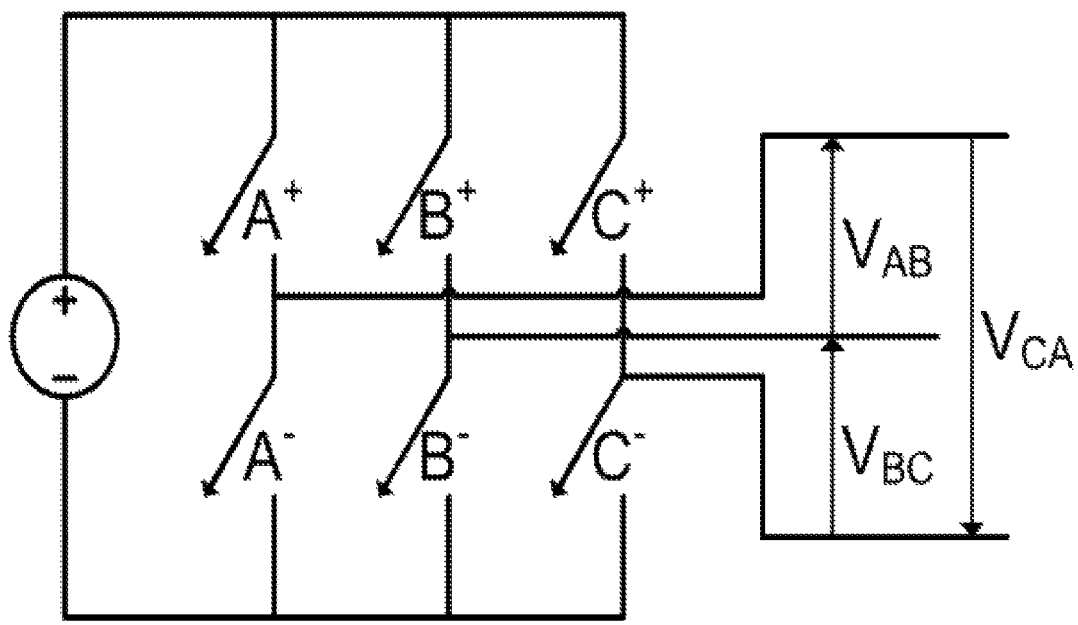
FIG. 1 illustrates an exemplary topological diagram of a three-phase inverter.

Embodiments of the present invention are described below by referring to the drawings. Numerous details are described below so that those skilled in the art can understand and realize the present invention. However, it is apparent for those skilled in the art that the realization of the present invention may not include some of the details. In addition, it should be understood that the present invention is not limited to the described specific embodiments. On the contrary, it is contemplated that the present invention can be realized using any combination of the features and elements described below, no matter whether the features and elements relate to different embodiments or not. Therefore, the following aspects, features, embodiments and advantages are only for illustration, and should not be taken as elements of or limitations to the claims, unless explicitly stated otherwise in the claims.

As known by those skilled in the art, PWM of a VFD refers to driving an AC motor to rotate with a variable power by controlling "on" and "off" timing and sequence of the switching elements in the inverter of the VFD. FIG. 1 illustrates a topological diagram of a three-phase inverter. The inverter must be controlled such that the two switches on the same leg cannot be on simultaneously at any time; otherwise, short circuit will occur to the DC power source. This requirement is met by complementary operations of the two switches on the same leg, that is, if A+ is on, A− is off and vice versa. Thus will be produced eight possible switch vectors $V_0$-$V_7$ of the inverter, including six effective vectors and two zero vectors, as shown in Table 1 below:

TABLE 1

Switch Vectors of the Inverter

| Vector | A+ | B+ | C+ | A− | B− | C− | $V_{AB}$ | $V_{BC}$ | $V_{CA}$ | |
|---|---|---|---|---|---|---|---|---|---|---|
| V0 = (000) | off | off | off | on | on | on | 0 | 0 | 0 | 0 vector |
| V1 = (001) | off | off | on | on | on | off | 0 | $-V_{dc}$ | $+V_{dc}$ | effective vector |
| V2 = (010) | off | on | off | on | off | on | $-V_{dc}$ | $+V_{dc}$ | 0 | effective vector |
| V3 = (011) | off | on | on | on | off | off | $-V_{dc}$ | 0 | $+V_{dc}$ | effective vector |
| V4 = (100) | on | off | off | off | on | on | $+V_{dc}$ | 0 | $-V_{dc}$ | effective vector |
| V5 = (101) | on | off | on | off | on | off | $+V_{dc}$ | $-V_{dc}$ | 0 | effective vector |
| V6 = (110) | on | on | off | off | off | on | 0 | $+V_{dc}$ | $-V_{dc}$ | effective vector |
| V7 = (111) | on | on | on | off | off | off | 0 | 0 | 0 | 0 vector |

Figure 2:
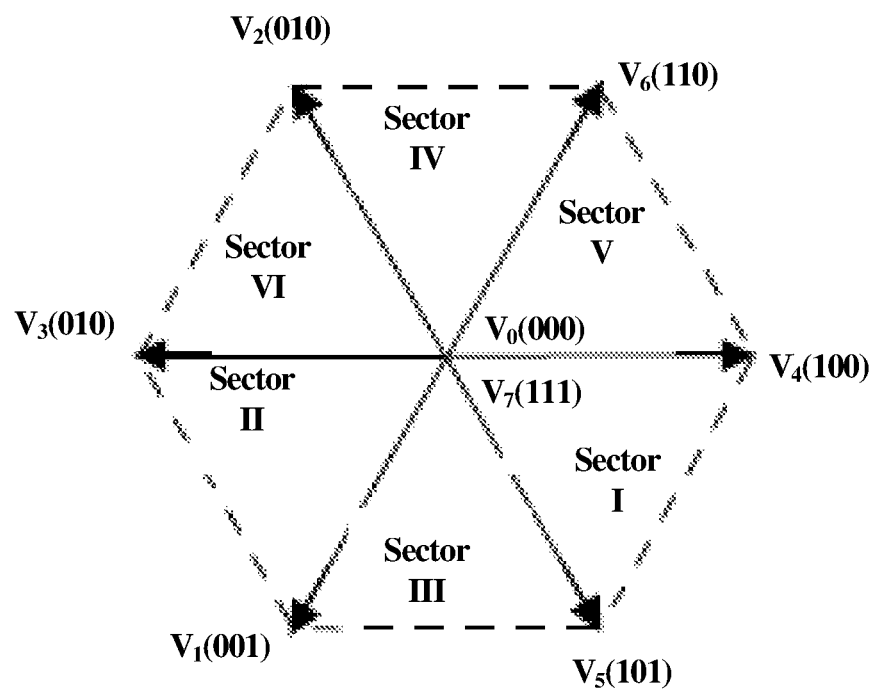
FIG. 2 illustrates an exemplary space vector diagram.

The eight vectors can be drawn in the exemplary space vector graph shown in FIG. 2. As shown in the figure, the space vector graph can be divided into six sectors, each sector involving two effective vectors on the edges of the sector and two zero vectors at the center of the vector graph. The PWM method using the vector graph refers to switching between vectors involved in the same sector in a modulation cycle, and in the next modulation cycle proceeding to the next sector to switch or continuing to switch in this sector. Usually, in one modulation cycle, two switchings are performed among three vectors in the corresponding sector. In a further PWM method, clamping phases are used. That is, in the two switchings in any modulation cycle, the switch state may remain unchanged in one phase, while state switching only occurs in the other two phases. For example, in sector I, during switchings among $V_4$ (100), $V_5$ (101) and $V_0$ (000), the second bit corresponding to phase B maintains to be zero, indicating that its state remains unchanged, thus phase B can be clamped and not participate in switching in this modulation cycle, and only phase A and phase C are used for switching.

The present invention realizes that selection of a clamping phase in each sector is not unique. In fact, there are two options in each sector, as summarized in the following table:

TABLE 2

Possible Clamping Phase(s) in Each Sector

| Sector | The first option Clamping | The second option Clamping |
|---|---|---|
| I | B | A |
| II | A | C |
| III | C | B |
| IV | C | B |
| V | A | C |
| VI | B | A |

For example, in sector I, when switching among $V_4$ (100), $V_5$ (101) and $V_0$ (000), phase B can act as the clamping phase; and when switching among $V_4$ (100), $V_5$ (101) and $V_1$ (111), phase A can act as the clamping phase, as currently the first bit corresponding to phase A remains to be 1 (indicating that its state remains unchanged). For another example, in sector II, when switching among $V_1$ (001), $V_3$ (011) and $V_0$ (000), phase A can act as the clamping phase; and when switching among $V_1$ (001), $V_3$ (011) and $V_1$ (111), phase C can act as the clamping phase. Use of such freedom can achieve further improvement of reduction of switching losses.

The present invention realizes that the switching losses are proportional to the current switched by the power device. In order to reduce the switching losses, the proposed PWM strategy may automatically eliminate switching actions in phases with larger current values. This strategy may be implemented in each PWM cycle after the determination of the sector (it may also be implemented in some of the PWM cycles).

Furthermore, in order to decrease higher VFD switching noises due to a higher average switching frequency and higher magnitudes of switching harmonics, this PWM strategy may only be used in large current conditions, which may occur in displacement switching and mechanical jams. Such conditions can be determined easily through real-time current magnitude information.

Figure 3:
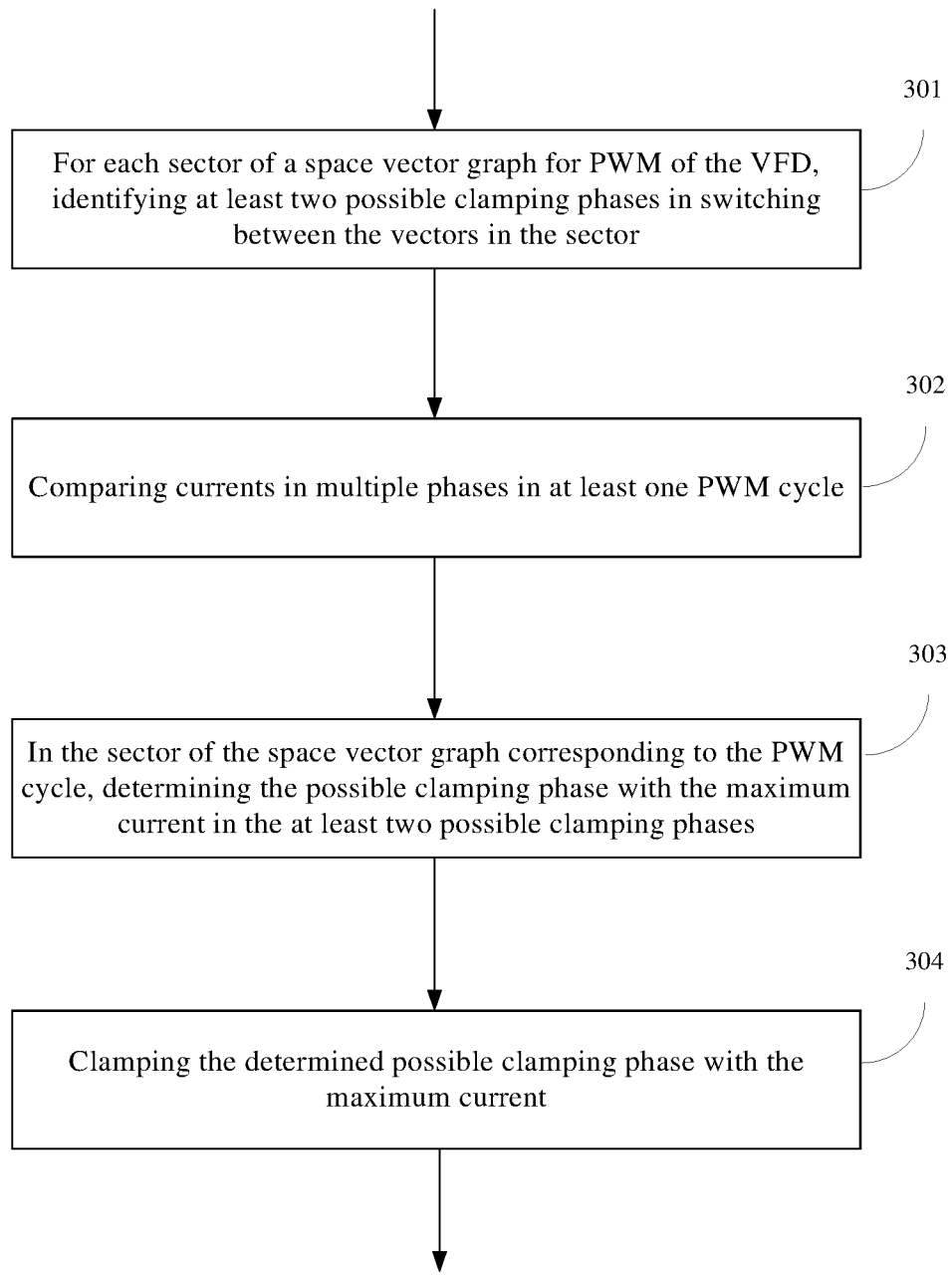
FIG. 3 illustrates a method for PWM of a VFD according to an embodiment of the present invention.

Now referring to FIG. 3, it illustrates a method for PWM of a VFD according to an embodiment of the present invention, the method comprising the following steps:

In step 301, for each sector of a space vector graph for PWM of the VFD, identifying at least two possible clamping phases in switching between the vectors in the sector. As each bit in the binary representations of the respective vectors in each sector corresponds to a different phase, an unchanged bit in the binary representations of the respective vectors may be found by comparing the binary representations of the respective vectors in each sector, and the phase corresponding to the unchanged bit may be determined as a possible clamping phase. At least two possible clamping phases in each sector may be stored in a form of a table as shown by Table 2, so that the two possible clamping phases in each sector may be determined by looking up in the table in subsequent steps.

In step 302, comparing currents in multiple phases in at least one PWM cycle. The step may be implemented by receiving current measurements from current sensors installed at respective phases and comparing the current measurements of the respective phases. The relative magnitude of the current in each phase may be determined by comparing the currents in the multiple phases.

In step 303, in the sector of the space vector graph corresponding to the PWM cycle, determining the possible clamping phase with the maximum current in the at least two possible clamping phases. Since in step 301 has been determined (and stored) at least two possible clamping phases in each sector of the space vector graph and in step 302 has been determined the relative magnitude of the current in each phase in the current PWM cycle, the relative magnitudes of the currents in the at least two possible clamping phases in the sector of the space vector graph corresponding to the current PWM cycle can be determined, thus the possible clamping phase with the maximum current in the at least two possible clamping phases can be determined. The space vector graph may be any space vector graph for PWM of a VFD, such as, a space vector graph including 6 sectors as shown in FIG. 2 or other forms of space vectors such as a 3D space vector graph.

In step 304, clamping the determined possible clamping phase with the maximum current. That is, in the switching of the PWM cycle, the switch state of the clamping state remains unchanged and only the switch states of the other phases change.

According to an embodiment of the present invention, the VFD is a three-phase VFD, thus, in step 301, the space vector has six sectors, and there are two possible clamping phases in vector switching in each sector; in step 302 the currents in three phases in the PWM cycle are compared to determine the relative magnitude of the current in each phase, and in step 303, in the sector of the space vector graph corresponding to the PWM cycle, the possible clamping phase with the maximum current is determined in the at least two possible clamping phases in the sector corresponding to the PWM cycle in order to clamp the possible clamping phase. Alternatively, step 303 may also be achieved in the following steps: determining the phase with the largest current and the phase with the second largest current in the three phases; determining whether the phase with the largest current is a possible clamping phase in the sector of space vector graph corresponding to the PWM cycle; in response to the determination being positive, determining that the phase with the largest current is the possible clamping phase with the maximum current to be clamped; and in response to the determination being negative, determining that the phase with the second largest current is the possible clamping phase with the maximum current to be clamped.

According to an embodiment of the present invention, the method further comprises the following steps: obtaining a real-time current magnitude, wherein the comparison step 302, the determination step 303 and the clamping step 304 in the method are performed only when the real-time current magnitude is larger than a threshold. The threshold may be designated in advance by a user or automatically designated so as to ensure that the PWM method of the present invention is performed only when the current is large, thus reducing VFD switching noises. The obtaining a real-time current magnitude may be realized by receiving current measurements from a current sensor.

According to an embodiment of the present invention, the VFD is used in an electro-hydraulic pump system. Of course, in other embodiments of the present invention, the VFD may also be used in other systems or applications.

According to an embodiment of the present invention, the space vector graph is a space voltage vector graph, and the vectors are voltage vectors.

According to an embodiment of the present invention, the method further comprises the following steps: in the PWM cycle, switching between the vectors while the possible clamping phase with the maximum current in the sector of the space vector graph corresponding to the PWM cycle is clamped. As known by those skilled in the art, the step is a normal switching operation for PWM of the VFD and may be implemented as any appropriate operation known to those skilled in the art or to be developed in the future.

The method for PWM of a VFD according to embodiments of the present invention is described above by referring to the figures. It should be pointed out that the description above is only exemplary, not limitation to the present invention. In other embodiments of the present invention, the method has more, less or different steps, and the sequential, including and functional relations among the steps may be different from that described and illustrated. In addition, as understood by those skilled in the art, the method may be realized in software, hardware or a combination thereof. Preferably, the method may be realized by programming the digital signal controller or another device for controlling the PWM process in the VFD. The programming may be embodied in program code to be loaded or executed by hardware, or which may be hardwired into hardware, thus forming part of the hardware.

Figure 4:
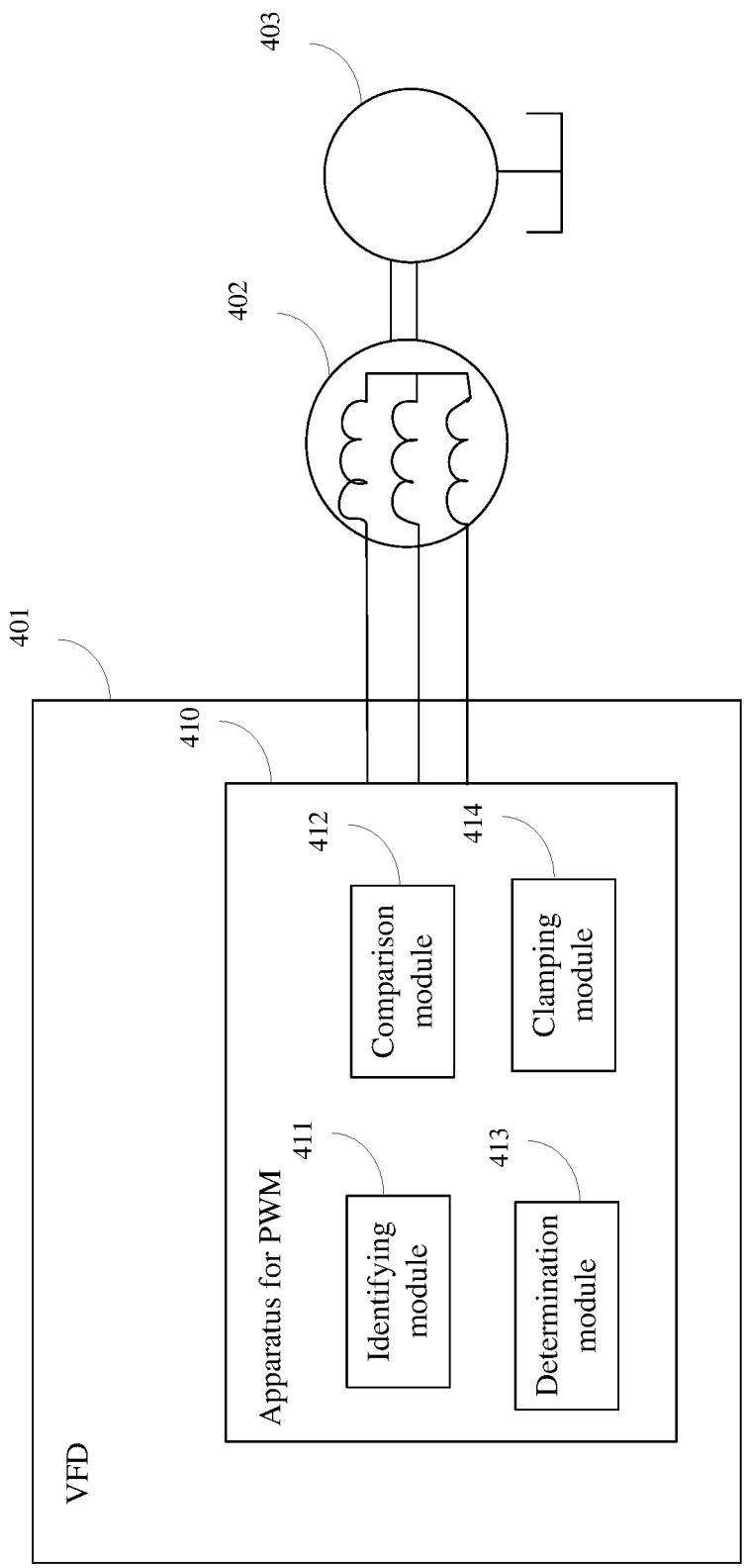
FIG. 4 illustrates an apparatus for PWM of a VFD according to embodiment of the present invention.

Now referring to FIG. 4, it illustrates an apparatus 410 for PWM of a VFD according to an embodiment of the present invention. It should be pointed out the apparatus 410 may be used for performing the method for PWM described above. For the sake of conciseness, some details repetitive with contents above omitted in the following description. Therefore, the above description may be referred to for a more thorough understanding of the apparatus for PWM.

As shown in FIG. 4, the PWM apparatus 410 is located within a VFD 401, the VFD controlling an electric motor 402, the electric motor driving the operation of an electro-hydraulic system 403 or other systems. The PWM apparatus 410 comprises an identifying module 411 configured to, for each sector of a space vector graph for PWM of the VFD, identify at least two possible clamping phases in switching between the vectors in the sector; a comparison module 412 configured to compare currents in multiple phases in at least one PWM cycle; a determination module 413 configured to, in the sector of the space vector graph corresponding to the PWM cycle, determine the possible clamping phase with the maximum current in the at least two possible clamping phases; and a clamping module 414 configured to clamp the determined possible clamping phase with the maximum current.

According to an embodiment of the present invention, the at least two possible clamping phases are two possible clamping phases, the multiple phases are three phases, and in the sector of space vector graph corresponding to the PWM cycle, the determination module comprises:

a first determination sub-module configured to determine the phase with the largest current and the phase with the second largest current in the three phases;

a second determination sub-module configured to determine whether the phase with the largest current is a possible clamping phase in the sector of space vector graph corresponding to the PWM cycle;

a third determination sub-module configured to, in response to the determination being positive, determine that the phase with the largest current is the possible clamping phase with the maximum current to be clamped; and a fourth determination sub-module configured to, in response to the determination being negative, determine that the phase with the second largest current is the possible clamping phase with the maximum current to be clamped.

According to an embodiment of the present invention, the PWM apparatus 410 further comprises: an obtaining module (not shown) configured to obtain a real-time current magnitude, wherein the comparison module 412, the determination module 413 and the clamping module 414 in the apparatus perform the operations only when the real-time current magnitude is larger than a threshold.

According to an embodiment of the present invention, the VFD is used in an electric motor-driven hydraulic pump system.

According to an embodiment of the present invention, the space vector graph is a space voltage vector graph, and the vectors are voltage vectors.

According to an embodiment of the present invention, the PWM apparatus 410 further comprises: a switch module (not shown) configured to, in the PWM cycle, switch between the vectors while the possible clamping phase with the maximum current in the sector of the space vector graph corresponding to the PWM cycle is clamped.

The apparatus for PWM of a VFD according to embodiments of the present invention is described above by referring to the figures. It should be pointed out that the description above is only exemplary, not limitation to the present invention. In other embodiments of the present invention, the apparatus may have more, less or different modules. The connecting, including and functional relations among all modules may be different from that described and illustrated herein. In addition, as understood by those skilled in the art, the apparatus may be realized by software, hardware or a combination thereof. Preferably, the apparatus is realized by programming a digital signal controller or another device for controlling the PWM process in the VFD. The programming may be embodied in program code to be loaded or executed by hardware, or which may be hardwired into hardware, thus forming part of the hardware.

As may be known from the description above, the method and apparatus according to embodiments of the present invention clamp the phase with the maximum current in each PWM cycle of the VFD, thus not only reduces the switching losses but also increases the maximum rated current of the VFD. Furthermore, the method and apparatus for PWM need only a small amount of calculations, and may be realized only by software in an embodiment, thus is a low-cost solution.

Exemplary embodiments of the present invention are described above, but present invention is not limited to this. Those skilled in the art may make various changes and modifications without departing from the spirit and scope of the present invention. For example, it is contemplated that the technical solution of the present invention is also applicable to other fluid pumps apart from hydraulic pumps. The scope of the present invention is only defined by the claims.

The invention claimed is:

1. A method for operating a hydraulic pump system with pulse-width modulation PWM of a variable-frequency drive VFD, comprising:
   for each sector of a space vector graph for the PWM of the VFD, identifying at least two possible clamping phases during displacement switching between a flow control mode and a pressure control mode in the hydraulic pump system comprising an electric motor and a hydraulic pump;
   comparing currents in multiple clamping phases in at least one PWM cycle by receiving current measurements from current sensors in the hydraulic pump system installed at respective clamping phases and comparing the current measurements of the respective clamping phases;
   in the sector of the space vector graph corresponding to the PWM cycle, determining the possible clamping phase with the maximum current in the at least two possible clamping phases;
   clamping the determined possible clamping phase with the maximum current, wherein a switch state of the possible clamping phase with the maximum current remains unchanged and only switch states of the other clamping phases change;
   obtaining a real-time current magnitude to detect the displacement switching, wherein the steps of comparison, determination and clamping are performed only in large current conditions in which the real-time current magnitude is larger than a threshold during the displacement switching, the threshold designated to ensure that the method is performed only when the current is larger than the threshold; and
   operating the hydraulic pump system by the PWM of the VFD by automatically eliminating switching actions in phases with current values larger than the threshold.

2. The method according to claim 1, wherein the at least two possible clamping phases are two possible clamping phases, the multiple phases are three phases, and in the sector of the space vector graph corresponding to the PWM cycle, determining the possible clamping phase with the maximum current in the at least two possible clamping phases comprises: determining the phase with the largest current and the phase with the second largest current in the three phases; determining whether the phase with the largest current is a possible clamping phase in the sector of space vector graph corresponding to the PWM cycle; upon determining that the phase with the largest current is a possible clamping phase, determining that the phase with the largest current is the possible clamping phase with the maximum current to be clamped; and upon determining that the phase with the largest current is not a possible clamping phase, determining that the phase with the second largest current is the possible clamping phase with the maximum current to be clamped.

3. The method according to claim 1, wherein the VFD is used in an electro-hydraulic pump system.

4. The method according to claim 1, wherein the space vector graph is a space voltage vector graph, and the vectors are voltage vectors.

5. The method according to claim 1, further comprising: in the PWM cycle, switching between the vectors while the possible clamping phase with the maximum current in the sector of the space vector graph corresponding to the PWM cycle is clamped.

6. The method according to claim 1, wherein the VFD is a three-phase VFD, the space vector graph has six sectors, and there are two possible clamping phases in vector switching in each sector.

7. The method according to claim 6, wherein currents in the three phases in the PWM cycle are compared to determine the relative magnitude of the current in each phase.

8. The method according to claim 1, further comprising repeating the steps of comparison, determination and clamping in each PWM cycle performed in the hydraulic pump system.

9. The method according to claim 1, wherein the threshold is designated by a user.

10. The method according to claim 1, wherein the threshold is automatically designated.

* * * * *